United States Patent
Xu et al.

(10) Patent No.: US 12,520,215 B2
(45) Date of Patent: Jan. 6, 2026

(54) METHOD AND COMMUNICATIONS APPARATUS FOR CONFIGURING ASSISTANCE INFORMATION

(71) Applicant: HUAWEI TECHNOLOGIES CO., LTD., Shenzhen (CN)

(72) Inventors: Xiaoying Xu, Shenzhen (CN); Feng Han, Shanghai (CN); Chong Lou, Shanghai (CN); Fang Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 380 days.

(21) Appl. No.: 18/164,431

(22) Filed: Feb. 3, 2023

(65) Prior Publication Data
US 2023/0199600 A1    Jun. 22, 2023

Related U.S. Application Data

(63) Continuation of application No. PCT/CN2020/107579, filed on Aug. 6, 2020.

(51) Int. Cl.
*H04W 36/30*  (2009.01)
*H04W 72/1273*  (2023.01)
*H04W 72/54*  (2023.01)

(52) U.S. Cl.
CPC ....... *H04W 36/30* (2013.01); *H04W 72/1273* (2013.01); *H04W 72/54* (2023.01)

(58) Field of Classification Search
CPC . H04W 36/30; H04W 72/1273; H04W 72/54; H04W 76/22; H04W 36/0033;
(Continued)

(56) References Cited

U.S. PATENT DOCUMENTS 11,632,732 B2 *  4/2023  Hande .................. H04W 72/53
                                                                        370/328
2020/0145817 A1 *  5/2020  Liu ..................... H04W 12/037
(Continued)

FOREIGN PATENT DOCUMENTS

CN          110167068 A      8/2019
CN          110351724 A     10/2019
(Continued)

OTHER PUBLICATIONS

ETSI TS 138_413 v16.2.0; 5G; NG-RAN; NG Application Protocol (NGAP) (Jul. 2020) (Year: 2020).*
(Continued)

*Primary Examiner* — Yaotang Wang
(74) *Attorney, Agent, or Firm* — Leydig, Voit & Mayer, Ltd.

(57) ABSTRACT

A method and communications apparatus for configuring assistance information is provided. A first network device sends a path switch request message to an access and mobility management function (AMF), where the path switch request message is used to request for switching least one radio bearer (RB) of a terminal device from a second network device to the first network device. The first network device receives a path switch request response message from the AMF. The first network device determines, based on the path switch request response message, a first burst arrival time at which a downlink quality of service QoS flow arrives at an ingress of the first network device within a first periodicity, where the first burst arrival time is used for downlink scheduling.

20 Claims, 8 Drawing Sheets

(58) Field of Classification Search
CPC . H04W 36/0064; H04W 36/08; H04W 88/14; H04L 5/0058; H04L 5/0062; H04L 5/0053

See application file for complete search history.

(56) References Cited

U.S. PATENT DOCUMENTS

| | | | |
|---|---|---|---|
| 2021/0051514 A1 | 2/2021 | Li et al. | |
| 2022/0030460 A1 | 1/2022 | Wang | |
| 2023/0090268 A1* | 3/2023 | Moon | H04J 3/0641 370/254 |
| 2023/0239868 A1* | 7/2023 | Kuo | H04W 72/1268 370/329 |

FOREIGN PATENT DOCUMENTS

| | | |
|---|---|---|
| CN | 110636547 A | 12/2019 |
| CN | 111092705 A | 5/2020 |
| WO | 2019031941 A1 | 2/2019 |
| WO | 2020104005 A1 | 5/2020 |

OTHER PUBLICATIONS

"Introduction of NR_IIOT support to TS 38.413," 3GPP TSG-RAN WG3 Meeting #107-e, R3-200056, Total 170 p. 3rd Generation Partnership Project, Valbonne France (Feb. 24-Mar. 6, 2020).

"3rd Generation Partnership Project; Technical Specification Group Radio Access Network; NR; NR and NG-RAN Overall Description; Stage 2 (Release 15)," 3GPP TS 38.300 V15.4.0, pp. 1-97, 3rd Generation Partnership Project, Valbonne France (Dec. 2018).

"3rd Generation Partnership Project; Technical Specification Group Radio Access Network; NG-RAN; NG Application Protocol (NGAP) (Release 16)," 3GPP TS 38.413 V16.0.0, pp. 1-335, 3rd Generation Partnership Project, Valbonne France (Dec. 2019).

"3rd Generation Partnership Project; Technical Specification Group Radio Access Network; NG-RAN; Xn application protocol (XnAP) (Release 16)," 3GPP TS 38.423 V16.0.0, pp. 1-330, 3rd Generation Partnership Project, Valbonne France (Dec. 2019).

"3rd Generation Partnership Project; Technical Specification Group Radio Access Network; NG-RAN; F1 application protocol (F1AP) (Release 15)," 3GPP TS 38.473 V15.4.1, pp. 1-192, 3rd Generation Partnership Project, Valbonne France (Jan. 2019).

"3rd Generation Partnership Project; Technical Specification Group Radio Access Network; NG-RAN; E1 Application Protocol (E1AP) (Release 15)," 3GPP TS 38.463 V15.4.0, pp. 1-177, 3rd Generation Partnership Project, Valbonne France (Jul. 2019).

"3rd Generation Partnership Project; Technical Specification Group Services and System Aspects; System architecture for the 5G System (5GS); Stage 2 (Release 16)," 3GPP TS 23.501 V16.3.0, pp. 1-417, 3rd Generation Partnership Project, Valbonne France (Dec. 2019).

"3rd Generation Partnership Project; Technical Specification Group Radio Access Network; NR; Radio Resource Control (RRC) protocol specification (Release 15)," 3GPP TS 38.331 V15.4.0, pp. 1-474, 3rd Generation Partnership Project, Valbonne France (Dec. 2018).

"3rd Generation Partnership Project; Technical Specification Group Radio Access Network; NG-RAN; F1 application protocol (F1AP) (Release 15)," 3GPP TS 38.473 V15.7.0, pp. 1-221, 3rd Generation Partnership Project, Valbonne France (Sep. 2019).

"3rd Generation Partnership Project; Technical Specification Group Radio Access Network; NG-RAN; NG Application Protocol (NGAP) (Release 16)," 3GPP TS 38.413 V16.2.0, pp. 1-461, 3rd Generation Partnership Project, Valbonne, France (Jul. 2020).

Oppo et al., "CN component of the PDB is configured per UL and DL," 3GPP TSG-SA WG2 Meeting #136AH, S2-2000144, Incheon, Korea, XP051842249, Total 4 pages, 3rd Generation Partnership Project, Valbonne, France (Jan. 13-17, 2020).

Huawei, "Introducing QoS parameters update at Xn handover," 3GPP TSG-RAN3 Meeting #110e, R3-206443, XP051945880, Total 3 p. 3rd Generation Partnership Project, Valbonne, France (Nov. 2-12, 2020).

\* cited by examiner

METHOD AND COMMUNICATIONS APPARATUS FOR CONFIGURING ASSISTANCE INFORMATION

CROSS-REFERENCE TO RELATED APPLICATIONS

This application is a continuation of International Application No. PCT/CN2020/107579, filed on Aug. 6, 2020, the disclosure of which is hereby incorporated by reference in its entirety.

TECHNICAL FIELD

This application relates to the field of communications technologies, and in particular, to a method and a communications apparatus for configuring assistance information.

BACKGROUND

With development of communications technologies, more communication scenarios appear. In some communication scenarios, requirements for both a delay and reliability are relatively high, for example, an ultra-reliable and low-latency communication (URLLC) service in an industrial control scenario. An indicator of an air interface of the URLLC service is set to meet a requirement of a user plane for ensuring a delay of one millisecond (ms) plus 99.999% reliability. Services in the industrial control scenario are classified into a deterministic service and a non-deterministic service. For the deterministic URLLC service, a service periodicity is determinate, and a service data amount generated within the periodicity is determinate.

In the conventional technology, for the deterministic service, a session management function (SMF) and an access and mobility management function (AMF), so that the base station more efficiently schedules and transmits a periodical deterministic QoS flow based on the service characteristic.

Because of mobility of a terminal device, the terminal device may hand over from a source base station to a target base station. However, in a scenario of switching an Xn interface between base stations, how a target base station obtains a service characteristic of a QoS flow is a problem that needs to be resolved.

SUMMARY

This application provides a method for configuring assistance information and a communications apparatus, to implement that a target base station obtains a service characteristic of a QoS flow in a scenario of switching an Xn interface between a base station and another base station.

According to a first aspect, a method for configuring assistance information is provided. The method is applied to a first network device, and the method includes the following steps: sending a path switch request message to an access and mobility management function, where the path switch request message is used to request for switching at least one radio bearer (RB) of a terminal device from a second network device to the first network device; receiving a path switch request response message from the access and mobility management function; and determining, based on the path switch request response message, first burst arrival time at which a downlink quality of service (QOS) flow arrives at an ingress of the first network device within a first periodicity, where the first burst arrival time is used for downlink scheduling. The first network device may perform downlink scheduling based on the first burst arrival time, and the first network device may more efficiently schedule and transmit the QoS flow based on the first burst arrival time, for example, semi-statically scheduling or dynamically scheduling the QoS flow through a pre-configured grant (configured Grant). A URLLC service is used as an example. URLLC services are classified into a deterministic service and a non-deterministic service. For the deterministic URLLC service, a service periodicity is determinate, and a service data amount generated within the periodicity is determinate. After obtaining a service characteristic of the deterministic service (for example, the first burst arrival time), the first network device may more effectively perform downlink scheduling. In another aspect, the first network device can determine the first burst arrival time simply based on the path switch request response message. There is no need for a conventional method in which the first burst arrival time is obtained in a PDU session modification procedure subsequently initiated by an SMF, thereby saving signaling overheads, reducing a delay generated in obtaining the first burst arrival time, further saving a system function, and improving system performance.

In a possible design, the path switch request response message carries the first burst arrival time. The path switch request response message carries the first burst arrival time, and there is no need to obtain the first burst arrival time in the PDU session modification procedure subsequently initiated by the SMF, thereby saving signaling overheads.

In a possible design, the method further includes: receiving a handover request message from the second network device, where the handover request message is used to request for switching least one RB of the terminal device from the second network device to the first network device, the handover request message carries second burst arrival time and a first packet delay budget (PDB) between a user plane function and the second network device, the second burst arrival time is time at which a burst of the downlink QoS flow arrives at an ingress of the second network device within a second periodicity, and the path switch request response message carries a second PDB between the user plane function and the first network device. The determining, based on the path switch request response message, first burst arrival time at which a downlink QoS flow arrives at an ingress of the first network device within a first periodicity includes: determining the first burst arrival time based on the second burst arrival time, the first PDB, and the second PDB. The second burst arrival time and the first PDB are obtained by using the handover request message from the second network device, the second PDB is obtained by using the path switch request response message, and there is no need to obtain the first burst arrival time in the PDU session modification procedure subsequently initiated by the SMF, thereby saving signaling overheads.

In a possible design, the first burst arrival time meets the following relationship formula: first burst arrival time=second burst arrival time−first PDB+second PDB. It can be understood that the foregoing relationship formula is an example. On the basis of the foregoing relationship formula, some variations may be made, for example, a parameter is multiplied by a coefficient, or an offset value is added on both sides of the equation, where the offset value may be positive or negative. The varied relationship formula can still be used to determine the first burst arrival time based on the second burst arrival time, the first PDB, and the second PDB.

In a possible design, the first burst arrival time is carried in time sensitive communication assistance information.

In a possible design, the first burst arrival time is carried in a TSC traffic characteristic.

According to a second aspect, a method for configuring assistance information is provided. The method is applied to an access and mobility management function, and the method includes the following steps: receiving a path switch request message from a first network device, where the path switch request message is used to request for switching least one radio bearer RB of a terminal device from a second network device to the first network device; and sending a path switch request response message to the first network device, where the path switch request response message is used by the first network device to determine first burst arrival time at which a downlink quality of service QoS flow arrives at an ingress of the first network device within a first periodicity, and the first burst arrival time is used for downlink scheduling.

In a possible design, the path switch request response message carries the first burst arrival time.

In a possible design, the path switch request response message carries a second packet delay budget PDB between a user plane function and the first network device. The second PDB is used by the first network device to determine the first burst arrival time.

In a possible design, the first burst arrival time meets the following relationship formula: first burst arrival time=second burst arrival time−first PDB+second PDB. The second burst arrival time is time at which a burst of the downlink QoS flow arrives at an ingress of the second network device within a second periodicity. The first PDB is a PDB between the user plane function and the second network device.

In a possible design, the first burst arrival time is carried in time sensitive communication assistance information.

In a possible design, the first burst arrival time is carried in a TSC traffic characteristic.

For a beneficial effect of the second aspect, refer to the description of the first aspect. The method in the second aspect is a solution for a peer device of the method in the first aspect, and has a same or corresponding characteristic as that of the first aspect.

For the first aspect and the second aspect, the following possible implementations are further designed in this application.

In a possible design, the first burst arrival time includes first time and second time. The first time is time at which the first data packet of the downlink QoS flow arrives at the ingress of the first network device within the first periodicity, and the second time is time at which the last data packet of the downlink QoS flow arrives at the ingress of the first network device within the first periodicity.

In a possible design, the first burst arrival time includes first time and first duration. The first time is time at which the first data packet of the downlink QoS flow arrives at the ingress of the first network device within the first periodicity. A moment that is after the first time and that is at a distance of the first duration from the first time is second time, and the second time is time at which the last data packet of the downlink QoS flow arrives at the ingress of the first network device within the first periodicity.

In a possible design, the first burst arrival time includes third time and second duration. A moment that is before the third time and that is at a distance of the second duration from the third time is fourth time. A moment that is after the third time and that is at a distance of the second duration from the third time is fifth time. The fourth time is time at which the first data packet of the downlink QoS flow arrives at the ingress of the first network device within the first periodicity, and the fifth time is time at which the last data packet of the downlink QoS flow arrives at the ingress of the first network device within the first periodicity.

It can be understood that when jitter exists, the last data packet herein is actually the first data packet. Due to jitter of the first data packet, the data packet may arrive at the first network device at both the first time and the second time.

According to a third aspect, a communications apparatus is provided. The apparatus may be a network device, which is denoted as a first network device, may be an apparatus (for example, a chip, a chip system, or a circuit) located in the first network device, or may be an apparatus that can match the first network device for use. The apparatus has a function of implementing the method in the first aspect and any one of the possible designs of the first aspect. The function may be implemented by hardware, or may be implemented by hardware executing corresponding software. The hardware or the software includes one or more modules corresponding to the foregoing function. In a design, the apparatus may include a communications module and a processing module. For example, the communications module is configured to: send a path switch request message to an access and mobility management function, where the path switch request message is used to request for switching least one radio bearer RB of a terminal device from a second network device to the first network device; and receive a path switch request response message from the access and mobility management function. The processing module is configured to determine, based on the path switch request response message, first burst arrival time at which a downlink quality of service QoS flow arrives at an ingress of the first network device within a first periodicity, where the first burst arrival time is used for downlink scheduling.

In a possible design, the path switch request response message carries the first burst arrival time.

In a possible design, the communications module is further configured to: receive a handover request message from the second network device, where the handover request message is used to request for switching least one RB of the terminal device from the second network device to the first network device, the handover request message carries second burst arrival time and a first packet delay budget PDB between a user plane function and the second network device, the second burst arrival time is time at which a burst of the downlink QoS flow arrives at an ingress of the second network device within a second periodicity, and the path switch request response message carries a second PDB between the user plane function and the first network device. That the processing module is configured to determine, based on the path switch request response message, first burst arrival time at which a downlink QoS flow arrives at an ingress of the first network device within a first periodicity includes: determining the first burst arrival time based on the second burst arrival time, the first PDB, and the second PDB.

In a possible design, the first burst arrival time meets the following relationship formula: first burst arrival time=second burst arrival time−first PDB+second PDB.

In a possible design, the first burst arrival time is carried in time sensitive communication assistance information.

In a possible design, the first burst arrival time is carried in a TSC traffic characteristic.

For a beneficial effect of the third aspect, refer to description of a corresponding characteristic of the first aspect.

According to a fourth aspect, a communications apparatus is provided. The apparatus may be a network device, which is denoted as a first network device, may be an apparatus (for example, a chip, a chip system, or a circuit) located in the first network device, or may be an apparatus that can match the first network device for use. The apparatus has a function of implementing the method in the first aspect and any one of the possible designs of the first aspect. The function may be implemented by hardware, or may be implemented by hardware executing corresponding software. The hardware or the software includes one or more modules corresponding to the foregoing function. In a design, the apparatus may include a communications module and a processing module. Further, the communications module may include a receiving module and a sending module.

For example, the receiving module is configured to receive a path switch request message from the first network device, where the path switch request message is used to request for switching least one radio bearer RB of a terminal device from a second network device to the first network device; and the sending module is configured to send a path switch request response message to the first network device, where the path switch request response message is used by the first network device to determine first burst arrival time at which a downlink quality of service QoS flow arrives at an ingress of the first network device within a first periodicity, and the first burst arrival time is used for downlink scheduling.

In a possible design, the path switch request response message carries the first burst arrival time.

In a possible design, the path switch request response message carries a second packet delay budget PDB between a user plane function and the first network device. The second PDB is used by the first network device to determine the first burst arrival time.

In a possible design, the first burst arrival time meets the following relationship formula: first burst arrival time=second burst arrival time−first PDB+second PDB. The second burst arrival time is time at which a burst of the downlink QoS flow arrives at an ingress of the second network device within a second periodicity. The first PDB is a PDB between the user plane function and the second network device.

In a possible design, the first burst arrival time is carried in time sensitive communication assistance information.

In a possible design, the first burst arrival time is carried in a TSC traffic characteristic.

For a beneficial effect of the fourth aspect, refer to description of a corresponding characteristic of the first aspect.

For the third aspect and the fourth aspect, the following possible implementations are further designed in this application.

In a possible design, the first burst arrival time includes first time and second time. The first time is time at which the first data packet of the downlink QoS flow arrives at the ingress of the first network device within the first periodicity, and the second time is time at which the last data packet of the downlink QoS flow arrives at the ingress of the first network device within the first periodicity.

In a possible design, the first burst arrival time includes first time and first duration. The first time is time at which the first data packet of the downlink QoS flow arrives at the ingress of the first network device within the first periodicity. A moment that is after the first time and that is at a distance of the first duration from the first time is second time, and the second time is time at which the last data packet of the downlink QoS flow arrives at the ingress of the first network device within the first periodicity.

In a possible design, the first burst arrival time includes third time and second duration. A moment that is before the third time and that is at a distance of the second duration from the third time is fourth time. A moment that is after the third time and that is at a distance of the second duration from the third time is fifth time. The fourth time is time at which the first data packet of the downlink QoS flow arrives at the ingress of the first network device within the first periodicity, and the fifth time is time at which the last data packet of the downlink QoS flow arrives at the ingress of the first network device within the first periodicity.

According to a fifth aspect, an embodiment of this application provides a communications apparatus. The apparatus includes a communications interface and a processor, and the communications interface is used by the apparatus to communicate with another device, for example, sending/receiving data or a signal. For example, the communications interface may be a transceiver, a circuit, a bus, a module, or another type of communications interface. The another device may be a network device. The processor is configured to invoke a group of programs, instructions, or data to perform the method described in the first aspect or each possible design of the first aspect. The apparatus may further include a memory, configured to store a program, instructions, or data invoked by the processor. The memory is coupled to the processor. When executing the instructions or the data stored in the memory, the processor may implement the method described in the first aspect or each possible design of the first aspect.

According to a sixth aspect, an embodiment of this application provides a communications apparatus. The apparatus includes a communications interface and a processor, and the communications interface is used by the apparatus to communicate with another device, for example, sending/receiving data or a signal. For example, the communications interface may be a transceiver, a circuit, a bus, a module, or another type of communications interface. The another device may be a terminal device. The processor is configured to invoke a group of programs, instructions, or data to perform the method described in the second aspect or each possible design of the second aspect. The apparatus may further include a memory, configured to store a program, instructions, or data invoked by the processor. The memory is coupled to the processor. When executing the instructions or the data stored in the memory, the processor may implement the method described in the second aspect or each possible design of the second aspect.

According to a seventh aspect, an embodiment of this application further provides a computer-readable storage medium, where the computer-readable storage medium stores computer-readable instructions. When the computer-readable instructions are run on a computer, the method in the first aspect, the second aspect, each possible design of the first aspect, or each possible design of the second aspect is performed.

According to an eighth aspect, an embodiment of this application provides a chip system. The chip system includes a processor, and may further include a memory, and is configured to implement the method in the first aspect, the second aspect, each possible design of the first aspect, or each possible design of the second aspect. The chip system may include a chip, or include a chip and another discrete device.

According to a ninth aspect, an embodiment of this application provides a communications system. The system includes a terminal device and a network device. The terminal device is configured to perform the method in the first aspect or each possible design of the first aspect. The network device is configured to perform the method in the second aspect or each possible design of the second aspect.

According to a tenth aspect, a computer program product including instructions is provided. When the computer program product is run on a computer, the method in the first aspect, the second aspect, each possible design of the first aspect, or each possible design of the second aspect is performed.

DESCRIPTION OF EMBODIMENTS

Embodiments of this application provide a method for configuring assistance information and a communications apparatus. The method and the apparatus are based on a same inventive concept. Because the method and the apparatus have a similar problem-resolving principle, for implementations of the apparatus and the method, refer to each other. No repeated description is provided. In descriptions of embodiments of this application, the term "and/or" describes an association relationship between associated objects and indicates that three relationships may exist. For example, A and/or B may indicate the following three cases: Only A exists, both A and B exist, and only B exists. The character "/" usually indicates an "or" relationship between associated objects. In this application, "at least one" means one or more, and "a plurality of" means two or more. In addition, it should be understood that in descriptions of this application, terms such as "first" and "second" are merely used for distinguishing and description, but should not be understood as indicating or implying relative importance, or should not be understood as indicating or implying a sequence.

The method for configuring assistance information provided in the embodiments of this application may be applied to a 4th generation (4G) communications system, for example, a long term evolution (LTE) communications system, or may be applied to a 5th generation (5G) communications system, for example, a 5G new radio (NR) communications system, or may be applied to various communications systems in the future, for example, a 6th generation (6G) communications system. The method provided in the embodiments of this application may be further applied to a Bluetooth system, a Wi-Fi system, a LoRa system, or an Internet of Vehicles system. The method provided in the embodiments of this application may be further applied to a satellite communications system, and the satellite communications system may be integrated with the foregoing communications system.

The following describes in detail embodiments of this application with reference to the accompanying drawings.

Figure 1:
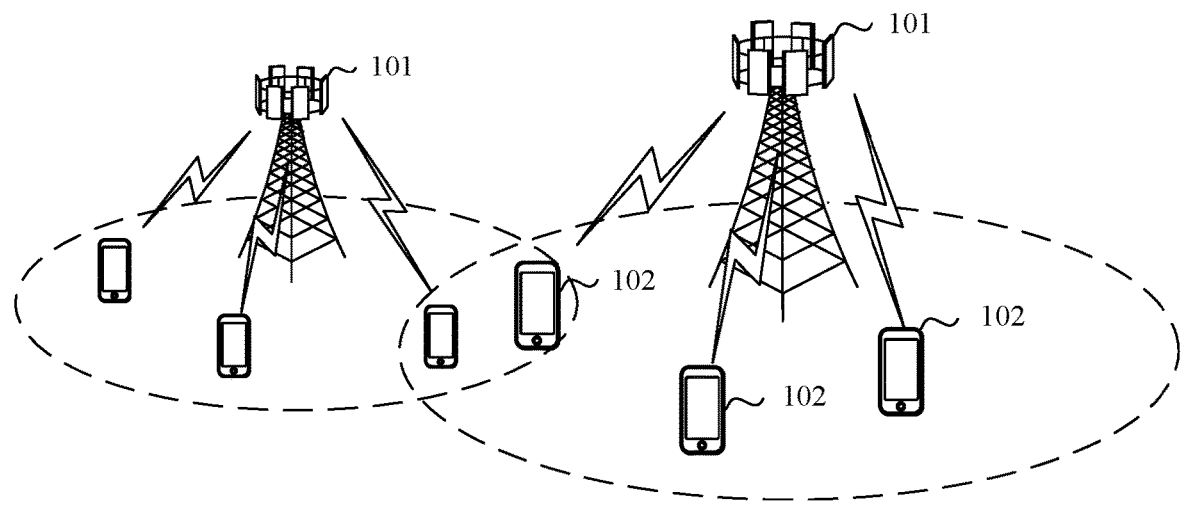
FIG. 1 is a schematic diagram of an architecture of a communications system according to an embodiment of this application.

For ease of understanding of the embodiments of this application, a communications system architecture shown in FIG. 1 is used as an example to describe an application scenario in which this application is used. Referring to FIG. 1, a communications system 100 includes a network device 101 and a terminal device 102. The apparatus provided in this embodiment of this application may be applied to the network device 101, or to the terminal device 102. It can be understood that FIG. 1 shows only a possible communications system architecture that may be applied to this embodiment of this application. In another possible scenario, the communications system architecture may also include another device.

The network device 101 is a node in a radio access network (RAN), which may also be referred to as a base station, or may further be referred to as a RAN node (or device). Currently, some examples of the network device 101 are: a gNB/NR-NB, a transmission and reception point (TRP), an evolved NodeB (eNB), a radio network controller (RNC), a NodeB (NB), a base station controller (BSC), a base transceiver station (BTS), a home base station (for example, a home evolved NodeB, a home NodeB. HNB), a base band unit (BBU), a wireless fidelity (Wi-Fi) access point (AP), a satellite device, a network device in a 5G communications system, or a network device in a possible communications system in the future. The network device 101 may alternatively be another device that has a network device function. For example, the network device 101 may alternatively be a device that functions as a network device in device to device (D2D) communication. Internet of Vehicles communication, and machine communication. The network device 101 may alternatively be a network device in a possible communications system in the future.

In some deployment, the gNB may include a centralized unit (CU) and a DU. The gNB may further include a radio frequency unit (RU). The CU implements some functions of the gNB, and the DU implements some functions of the gNB, for example, the CU implements functions of radio resource control (RRC) and a packet data convergence protocol (PDCP) layer, and the DU implements functions of radio link control (RLC), media access control (MAC), and a physical (PHY) layer. Information at the RRC layer eventually becomes information at the PHY layer, or is converted from the information at the PHY layer. Therefore, in the architecture, higher layer signaling such as RRC layer signaling or PDCP layer signaling may also be considered as being sent by the DU or sent by the DU and the RU. It may be understood that the network device may be a CU node, a DU node, or a device including a CU node and a DU node.

In addition, the CU may be classified as a network device in an access network RAN, or the CU may be classified as a network device in a core network CN. This is not limited herein.

The terminal device 102, which may also be referred to as user equipment (UE), a mobile station (MS), a mobile terminal (MT), or the like, is a device that provides voice or data connectivity to a user, or may be an Internet of Things device. For example, the terminal device includes a handheld device that has a wireless connection function, a vehicle-mounted device, and the like. Currently, the terminal device may be a mobile phone, a tablet computer, a notebook computer, a palmtop computer, a mobile Internet device (MID), a wearable device (for example, a smart watch, a smart band, or a pedometer), a vehicle-mounted device (for example, a vehicle, a bicycle, an electric vehicle, an aircraft, a ship, a train, or a high-speed railway), a virtual reality (VR) device, an augmented reality (AR) device, a wireless terminal in industrial control, a smart home device (for example, a refrigerator, a television, an air conditioner, or an electric meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot-air balloon, an uncrewed aerial vehicle, or an aircraft), or the like. The terminal device may alternatively be another device that has a terminal function, for example, the terminal device may alternatively be a device that functions as a terminal in D2D communication. In this application, a terminal device that has a wireless transmitting/receiving function and a chip that can be disposed in the foregoing terminal device are collectively referred to as a terminal device.

On the basis of the communications system architecture shown in FIG. 1, optionally, the communications system architecture applicable to this embodiment of this application may further include a functional network element or a functional entity of a core network. For example, the communications system architecture may further include an access and mobility management function 103, and may further include a user plane function 104. With evolution of the communications system, the access and mobility management function 103 and the user plane function 104 may have different names.

Figure 2:
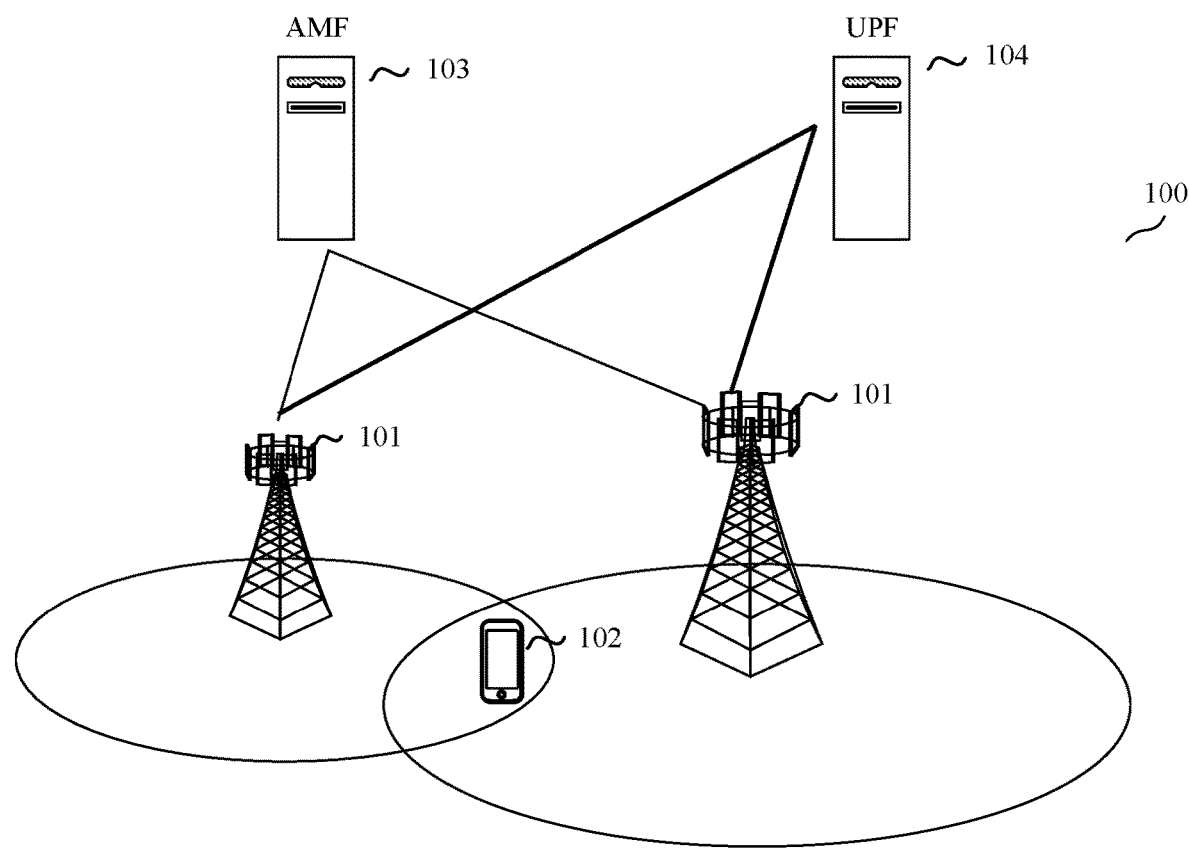
FIG. 2 is a schematic diagram of a 5GS architecture according to an embodiment of this application.

As shown in FIG. 2, for example, in the 5th generation system (5GS), the access and mobility management function 103 may be an AMF 103, and the user plane function 104 may be a UPF 104. This embodiment of this application is applicable to a scenario of the 5GS, including a non-roaming scenario and a roaming scenario. In the 5GS, both a service-based architecture and an interface-based architecture may be used. FIG. 2 uses an example of the non-roaming 5GS scenario. In the non-roaming 5GS scenario, a connection relationship between devices related to the solution in this embodiment of this application is shown in FIG. 2. An interface exists between the network device 101 and the AMF 103, for example, the interface may be an NG2 interface. An interface exists between the network device 101 and the UPF 104, for example, the interface may be an NG3 interface.

In this embodiment of this application, the AMF 103 is mainly responsible for access management and mobility management of UE, and control plane signaling between the core network and the access network is transmitted through an N2 interface. The UPF 104 is responsible for functions such as data packet transmission and routing. User plane data between the core network and the access network is transmitted through a tunnel protocol-user plane (GPRS tunnel protocol-user plane, GTP-U) tunnel of an N3 interface.

It can be understood that the communications system architecture applicable to this embodiment of this application may further include more or fewer devices, for example, may further include a session management function (SMF). The SMF is responsible for protocol data unit (PDU) session management, and transfers QoS flow configuration and a QoS requirement of a PDU session to the NG-RAN by using the AMF.

With reference to the communications systems shown in FIG. 1 and FIG. 2, the following describes in detail the method for configuring assistance information provided in the embodiments of this application.

In this embodiment of this application, the terminal device may switch from a source network device to a target network device. A process of switching between network devices may also be understood as a process of reselecting a network device. The target network device may also be referred to as a first network device, and the source network device may also be referred to as a second network device. Switching of the terminal device from the source network device to the target network device may be understood as switching of one or more radio bearers (RBs) of the terminal device from the source network device to the target network device, or may be understood as migration of the one or more RBs of the terminal device from the source network device to the target network device.

In a possible application scenario 1, the method provided in this embodiment of this application is applicable to a scenario of switching an Xn interface, to be specific, the source network device may directly send a handover request to the target network device through the Xn interface.

In another possible application scenario 2, the method provided in this embodiment of this application is applicable to a scenario in which a terminal device in an inactive state migrates UE context from a source serving network device to a target serving network device. In this application scenario, the context of the terminal device is migrated from the source serving network device to the target serving network device. The source serving network device of the terminal device may also be referred to as a last serving network device (last serving gNB) of the terminal device. The target network device in this embodiment of this application may be considered as the target serving network device of the terminal device, and the source network device may be considered as the source serving network device or the last serving network device of the terminal device.

Figure 3:
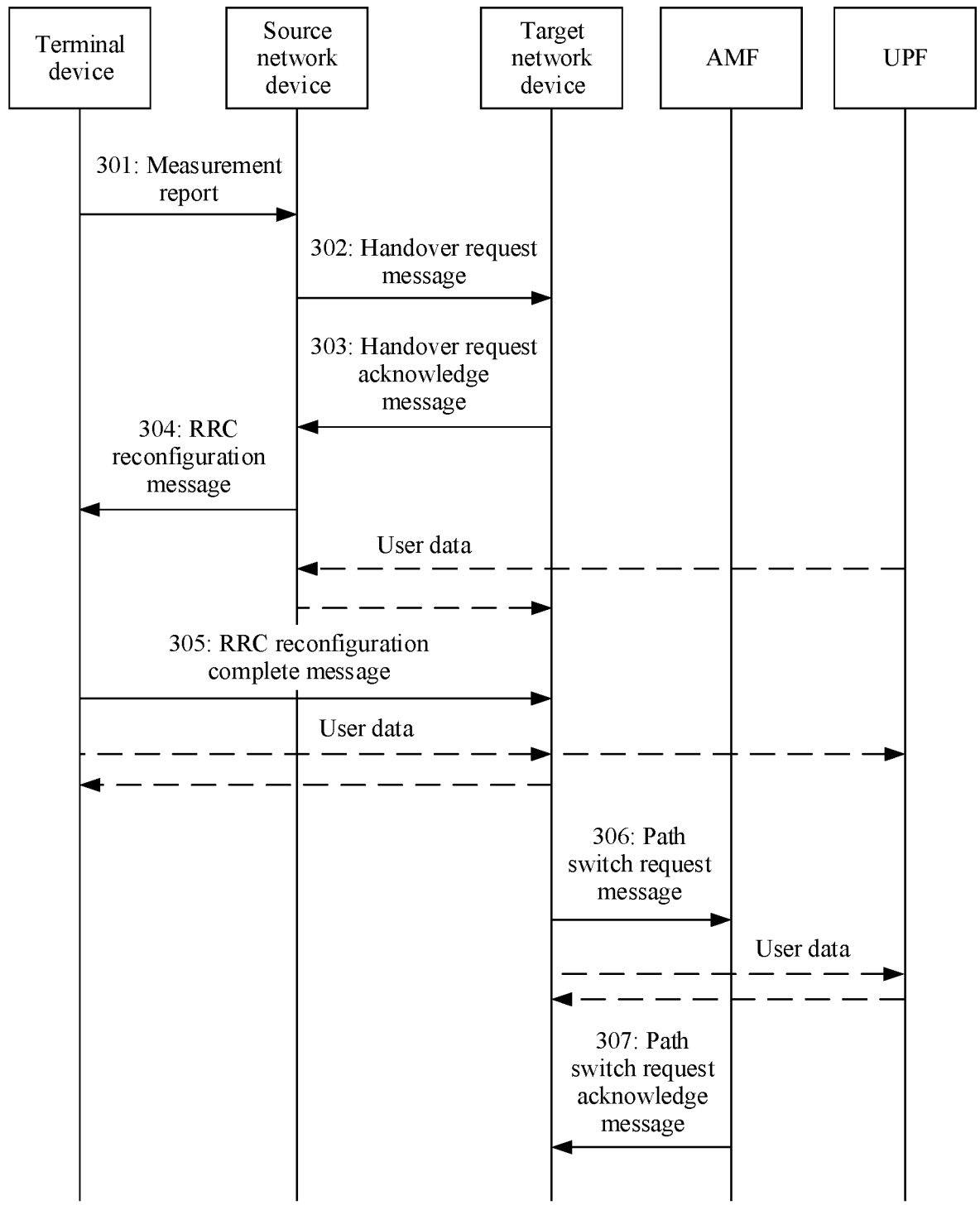
FIG. 3 is a first schematic diagram of a procedure of a switch scenario according to an embodiment of this application.
Figure 4:
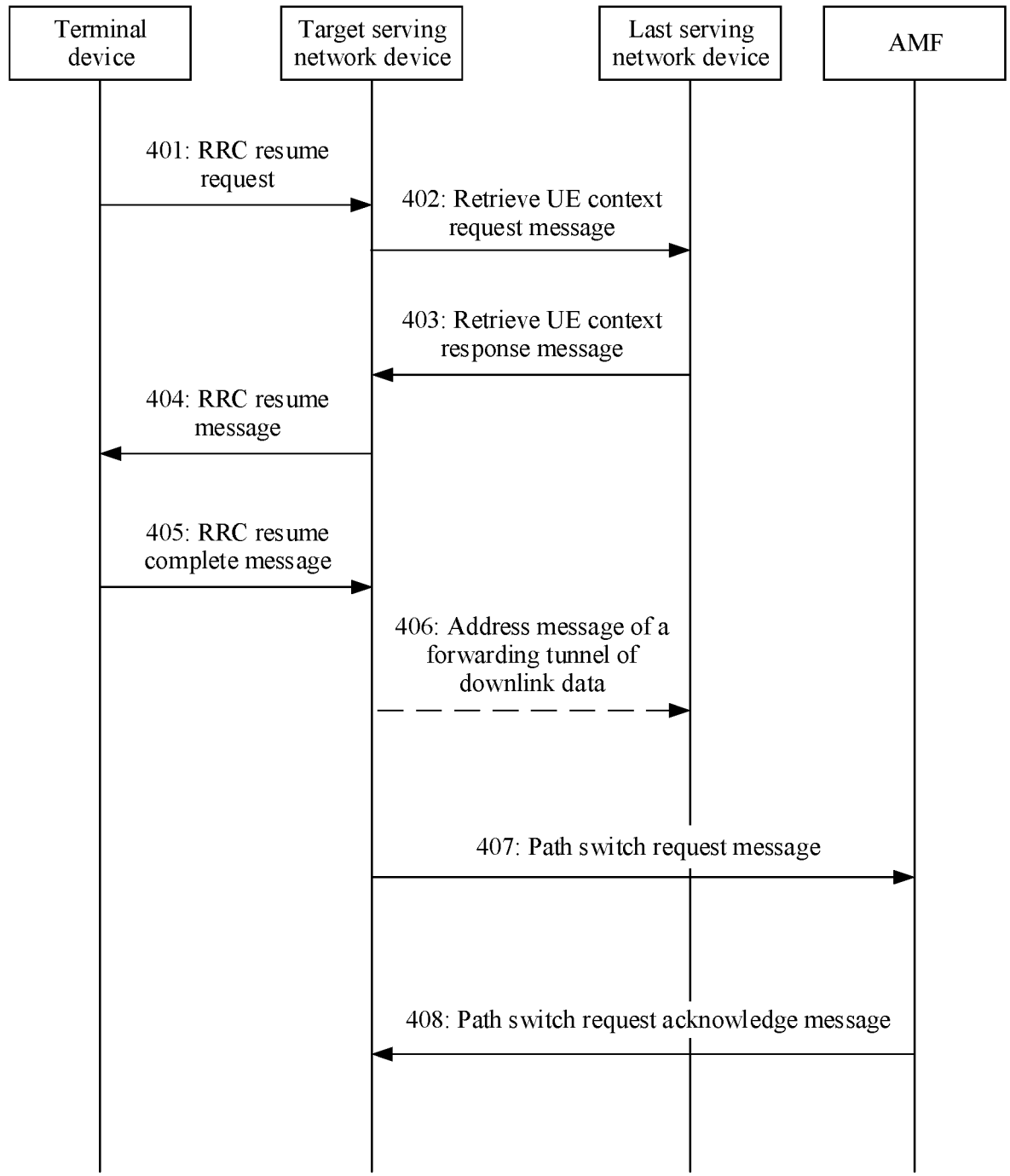
FIG. 4 is a second schematic diagram of a procedure of a switch scenario according to an embodiment of this application.

For the possible application scenario 1 and the possible application scenario 2, the following separately uses FIG. 3 and FIG. 4 as examples for description of a switch scenario in this embodiment of this application.

First, referring to FIG. 3, a switch procedure of the Xn interface between gNBs is first described.

S301: The terminal device sends a measurement report to the source network device, and the source network device receives the measurement report from the terminal device.

The terminal device performs measurement based on measurement configuration of the source network device, and reports the measurement based on the measurement configuration. The measurement report may include a measurement result of a radio channel of a neighboring cell and/or a measurement result of a radio channel of a serving cell.

S302: The source network device sends a handover request message to the target network device, and the target network device receives the handover request message from the source network device.

The handover request message carries one or more pieces of QoS information, and the QoS information includes QoS flow configuration.

S303: The target network device configures a parameter of a data radio bearer (DRB) for a QoS flow based on the QoS information, and sends a handover request acknowledge message to the source network device. The source network device receives the handover request acknowledge message from the target network device.

S304: The source network device sends, to the terminal device, a radio resource control (RRC) reconfiguration message that includes a handover command.

After receiving the RRC reconfiguration message from the source network device, the terminal device accesses the target network device based on the handover command.

The handover command carries one or more DRBs and configuration of a logical channel (LCH) corresponding to the one or more DRBs.

Optionally, the source network device may further forward, to the target network device, downlink user data that is of the terminal device and that is received from the UPF.

S305: The terminal device performs configuration based on the RRC reconfiguration message, and sends an RRC reconfiguration complete message to the target network device, and the target network device receives the RRC reconfiguration complete message from the terminal device.

After receiving the RRC reconfiguration message, the terminal device accesses the target network device based on corresponding configuration. In this way, the terminal device may send uplink user data to the target network device, and the target network device sends the uplink user data of the terminal device to the UPF. Optionally, the target network device may send, to the terminal device, the downlink user data that is of the terminal device and that is forwarded by the source network device to the target network device.

S306: The target network device sends a path switch request message to the AMF, and the AMF receives the path switch request message from the target network device.

The path switch request message may be used to trigger the core network to switch a downlink path to the target network device.

Specifically, the path switch request message carries downlink tunnel address information of a session in the target network device.

The target network device may transmit the uplink user data of the terminal device to the UPF.

The core network may switch the downlink path to the target network device in the following procedure. The AMF sends a PDU session update context request (Nsmf_PDUSession_UpdateSMContext Request) message to the SMF, where the message carries downlink tunnel address information of a session in the target network device. The SMF sends an N4 session modification request message to the UPF, where the message carries downlink tunnel address information of a session in the target network device. The UPF sends an N4 session modification response message to the SMF, where the message carries uplink tunnel address information that is of a session switched to the target network device and that is in the UPF. The SMF sends a PDU session update context response (Nsmf_PDUSession_UpdateSMContext Response) message to the AMF to indicate session information successfully switched to the target network device. After the SMF sends the N4 session modification request message to the UPF, the UPF may also send the downlink user data of the terminal device to the target network device.

S307: The AMF sends a path switch request acknowledge (path switch request ack) message to the target network device. The target network device receives the path switch request acknowledgment message from the AMF.

The path switch request acknowledgment message may carry the session information that is received from the SMF and that is successfully switched to the target network device.

In this embodiment of this application, for a switch process of the Xn interface of the terminal device, refer to description in the specification 3GPP TS38.331 v15.4.0.

Referring to FIG. 4, a procedure of migrating context by the terminal device is described. In this application scenario, the context of the terminal device is migrated from the source serving network device to the target serving network device. The target network device may be considered as the target serving network device of the terminal device. The source network device may be considered as the source serving network device or the last serving network device of the terminal device.

When the terminal device moves to a new serving base station (that is, the target network device), and the terminal device has an uplink service transmission requirement, the terminal device may initiate a context migration procedure, which is specifically described below.

S401: The terminal device sends an RRC resume request message to the target serving network device. The target serving network device receives the RRC resume request message from the terminal device.

The RRC resume request message carries identity verification information of the terminal device, and the RRC resume request message may further carry an inactive radio network temporary identifier (I-RNTI) allocated by the source serving network device. The source serving network device is a network device that serves the terminal device when the terminal device is in a connected state for the last time, and may also be referred to as the last serving network device (last serving gNB) of the terminal device.

S402: The target serving network device determines a last serving network device in which the terminal device is located, and sends a retrieve UE context request message to the last serving network device. The last serving network device receives the retrieve UE context request message from the target serving network device.

The retrieve UE context request message may carry identity verification information, or may carry an I-RNTI.

S403: The last serving network device sends a retrieve UE context response message to the target serving network device. The target serving network device receives the retrieve UE context response message from the last serving network device.

The last serving network device determines the context of the UE based on the I-RNTI, and verifies identity information of the terminal device based on a security key of the terminal device. After the verification succeeds, the last serving network device sends a UE context response message to the target serving network device.

S404: The target serving network device sends an RRC resume message to the terminal device. The terminal device receives the RRC resume message from the target serving network device.

The terminal device is switched to a connected state.

S405: The terminal device sends an RRC resume complete message to the target serving network device. The target serving network device receives the RRC resume complete message from the terminal device.

S406: The target serving network device sends an address message of a forwarding tunnel of downlink data to the last serving network device, so that the last serving network device buffers the downlink data and forwards the downlink data to the target serving network device without loss.

This step is an optional step.

S407: The target serving network device sends a path switch request message to the AMF. The AMF receives the path switch request message from the target serving network device.

The path switch request message may be used to trigger the core network to switch a downlink path to the target serving network device.

The path switch request message may carry downlink tunnel address information of a session in the target serving network device. For a procedure of switching the downlink path to the target serving network device by the core network, refer to the foregoing procedure of switching the downlink path to the target serving network device by the core network in S306. Details are not described herein again.

S408: The AMF sends a path switch request acknowledge (path switch request ack) message to the target serving network device. The target serving network device receives the path switch request acknowledgment message from the AMF.

Figure 5:
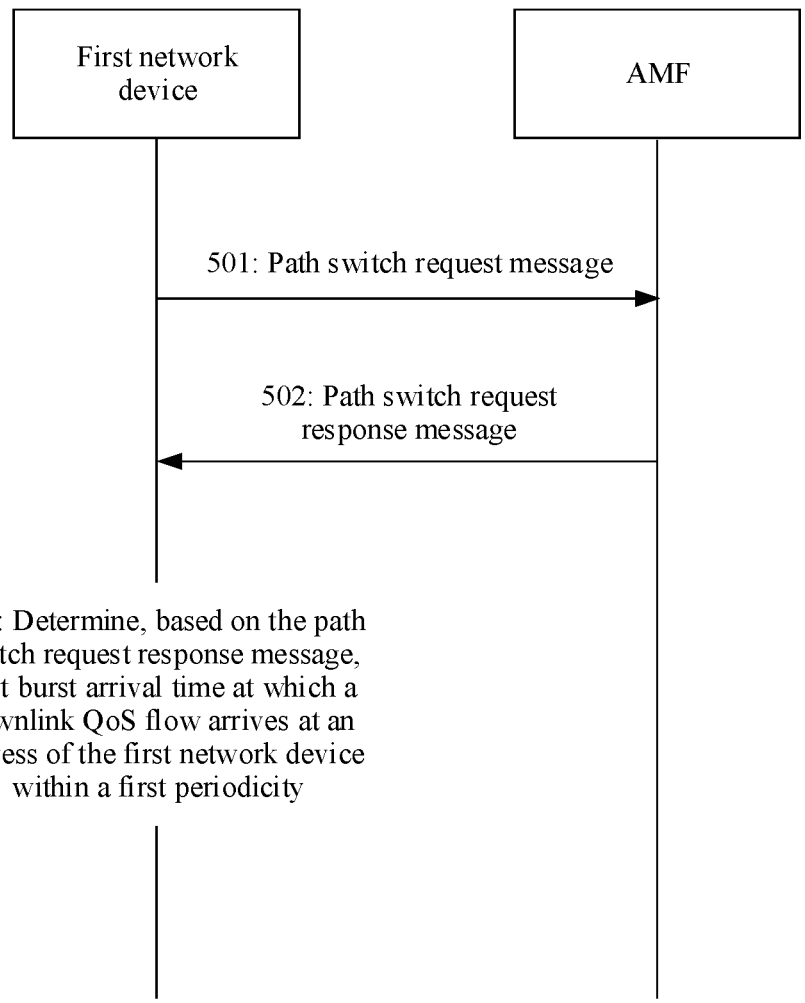
FIG. 5 is a schematic flowchart of a method for configuring assistance information according to an embodiment of this application.

As shown in FIG. 5, a procedure of the method for configuring assistance information provided in this embodiment of this application is as follows. In this embodiment of this application, an AMF is used to represent an access and mobility management function, and a UPF is used to represent a user plane function. It can be understood that each function may have different names in different communications systems, or may be replaced with another name. In this embodiment, a first network device may be the target network device, and a second network device may be the source network device.

S501: The first network device sends a path switch request message to the AMF. Correspondingly, the AMF receives the path switch request message from the first network device.

The path switch request message is used to request for switching least one RB of a terminal device from the second network device to the first network device. For example, a switch scenario may be the application scenario 1 shown in FIG. 3, the application scenario 2 shown in FIG. 4, or certainly may be another switch scenario.

S502: The AMF sends a path switch request response message to the first network device. Correspondingly, the first network device receives the path switch request response message from the AMF.

The path switch request response message is a response message for the path switch request message in S501. Optionally, the path switch request response message may carry session information that is from the SMF and that is successfully switched to the target network device.

S503: The first network device determines, based on the path switch request response message, first burst arrival time at which a downlink QoS flow arrives at an ingress of the first network device within a first periodicity.

In this embodiment of this application, a QoS flow may also be referred to as a service flow or service data. The first periodicity is any periodicity in which the downlink QoS flow periodically arrives at the ingress of the first network device.

In this embodiment of this application, the periodicity may refer to a time interval between start time of two data bursts (the time period between start of two bursts). For distinguishing, the first periodicity and a second periodicity may be used for description.

The first network device may perform downlink scheduling based on the first burst arrival time, and the first network device may more efficiently schedule and transmit the QoS flow based on the first burst arrival time, for example, semi-statically scheduling or dynamically scheduling the QoS flow through a pre-configured grant (configured Grant). A URLLC service is used as an example. URLLC services are classified into a deterministic service and a non-deterministic service. For the deterministic URLLC service, a service periodicity is determinate, and a service data amount generated within the periodicity is determinate. After obtaining a service characteristic of the deterministic service (for example, the first burst arrival time), the first network device may more effectively perform downlink scheduling.

Based on the embodiment shown in FIG. 3 or FIG. 4, the target network device may obtain, by using a possible embodiment A, burst arrival time at which a downlink QoS flow arrives at an ingress of the target network device within a periodicity. In the embodiment A, in S307 or S408, after the AMF sends the path switch request acknowledgment message to the target network device, it indicates that switching is completed. After the switching is completed, the SMF initiates PDU session modification, and the AMF indicates the target network device to modify a QoS flow, to indicate a service characteristic of each QoS flow. For example, the AMF sends a PDU session resource modify request message to the target network device. After receiving the PDU session resource modify request message, the target network device sends a PDU session resource modify response message to the AMF. The PDU session resource modify request message may carry a service characteristic of the downlink QoS flow. The service characteristic of the downlink QoS flow includes time sensitive communication assistance information (TSCAI) downlink. The downlink TSCAI may further include burst arrival time at which the downlink QoS flow arrives at the ingress of the target network device within a periodicity.

It can be learned that in the embodiment A, after the switching is completed, the PDU session modification needs to be initiated by using the SMF, so that the target network device can obtain the burst arrival time at which the downlink QoS flow arrives at the ingress of the target network device within a periodicity. In contrast, in the embodiment in FIG. 5, the first network device can determine the first burst arrival time simply based on the path switch request response message. With reference to the embodiment in FIG. 3, that the first network device receives the path switch request response message may correspond to S307. With reference to the embodiment in FIG. 4, that the first network device receives the path switch request response message may correspond to S408. Therefore, in the embodiment in FIG. 5, after step S307 or step S408 is completed, the first burst arrival time can be obtained. There is no need to obtain the first burst arrival time in a PDU session modification procedure subsequently initiated by the SMF, thereby saving signaling overheads, reducing a delay generated in obtaining the first burst arrival time, further saving a system function, and improving system performance.

The following describes in detail some optional implementations of the embodiment in FIG. 5.

In S503, the first network device may determine the first burst arrival time based on the path switch request response message in the following two manners.

Manner 1

The path switch request response message in S502 carries the first burst arrival time, and the first network device obtains the first burst arrival time from the path switch request response message.

With reference to the embodiment in FIG. 3 or FIG. 4, when the AMF in S307 or S408 sends the path switch request acknowledge message to the target network device, the message may carry the first burst arrival time.

Manner 2

Before S501, the following step is further included: The second network device sends a handover request message to the first network device. Correspondingly, the first network device receives the handover request message from the second network device.

The handover request message is used to request for switching least one RB of the terminal device from the second network device to the first network device. The handover request message carries second burst arrival time at which the downlink QoS flow arrives at an ingress of the second network device within a second periodicity. The handover request message further carries a first packet delay budget (PDB) between the UPF and the second network device. The first PDB is a packet transmission delay budget generated when the UPF arrives at the second network device. The second periodicity is any periodicity in which the downlink QoS flow periodically arrives at the ingress of the second network device.

It can be understood that, burst arrival time at which the downlink QoS flow arrives at an ingress of a network device within a periodicity may be equal to the sum of time at which a data burst of the downlink QoS flow arrives at the UPF and a downlink PDB between the UPF and the network device.

Figure 6:
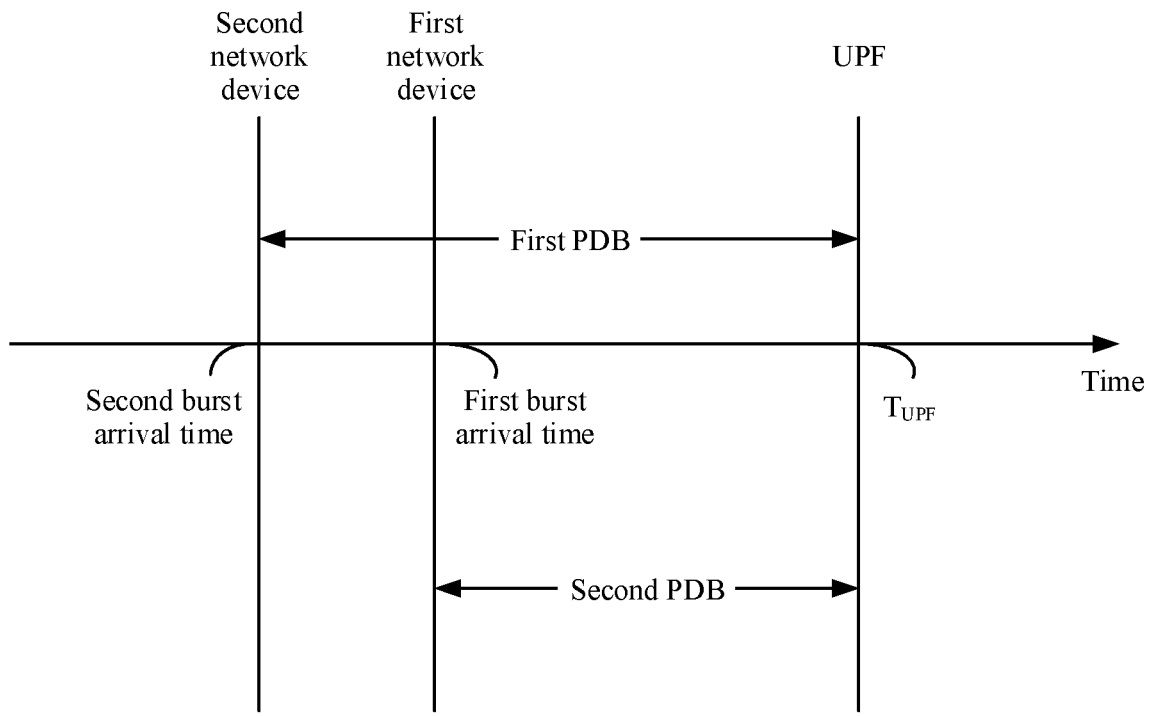
FIG. 6 is a schematic diagram of a relationship between burst arrival time according to an embodiment of this application.

Based on this, as shown in FIG. 6, $T_{UPF}$ is used to represent the time at which the data burst of the downlink QoS flow arrives at the UPF. Then the second burst arrival time=$T_{UPF}$+first PDB. Further, the following may be obtained through calculation: $T_{UPF}$=second burst arrival time−first PDB.

The first network device may determine, through S500, the time $T_{UPF}$ at which the data burst of the downlink QoS flow arrives at the UPF. If the first network device knows a second PDB between the UPF and the first network device, the first burst arrival time may be determined.

In this embodiment of this application, the first network device may obtain the second PDB by using any message. For example, in S502, the path switch request response message sent by the AMF to the first network device carries the second PDB between the UPF and the first network device. The first network device can determine the first burst arrival time based on the second burst arrival time, the first PDB, and the second PDB. As shown in FIG. 6, the first burst arrival time may meet the following relationship formula: first burst arrival time=second burst arrival time−first PDB+second PDB.

It can be understood that the foregoing relationship formula is an example. On the basis of the foregoing relationship formula, some variations may be made, for example, a parameter is multiplied by a coefficient, or an offset value is added on both sides of the equation, where the offset value may be positive or negative. The varied relationship formula can still be used to determine the first burst arrival time based on the second burst arrival time, the first PDB, and the second PDB.

With reference to the embodiment in FIG. 3, S500 may correspond to S302. In S307, the path switch request acknowledge message sent by the AMF to the target network device may carry the second PDB. The first network device may determine the first burst arrival time based on the second burst arrival time and the first PDB that are carried in the handover request message in S302, and based on the second PDB carried in path switch request acknowledge message in S307.

The following describes a manner of carrying burst arrival time in this embodiment of this application, which is applicable to the first burst arrival time, and is also applicable to the second burst arrival time.

The burst arrival time may be carried in a path switch request acknowledge transfer information element (IE) in TS 38.413.

An optional carrying manner 1 is shown in Table 1.

TABLE 1

| IE/Group name | Semantic description |
| --- | --- |
| QoS flow parameter list | Refer to TS 38.413 |
| >QoS flow parameter item | Refer to TS 38.413 |
| >>QoS flow identifier | Refer to TS 38.413 |
| >>Burst arrival time or downlink burst arrival time (DL Burst Arrival Time) | Indicate time at which a burst of a downlink QoS flow in time sensitive communication arrives at an ingress of a network device |

In Table 1, ">" represents an information element of a first level in the QoS flow parameter list, and ">>" represents an information element whose level is lower than a level of the ">" information element. An information element ">QoS flow parameter item" includes two information elements of a same level: the QoS flow identifier and the burst arrival time.

An optional carrying manner 2 is shown in Table 2.

TABLE 2

| IE/Group name | Semantic description |
| --- | --- |
| >QoS flow parameter item | Refer to TS 38.413 |
| >>QoS flow identifier | Refer to TS 38.413 |
| >>Time sensitive communication assistance information (TSCAI) or downlink time sensitive communication assistance information (TSC Assistance Information Downlink) | Indicate assistance information of a downlink QoS flow in time sensitive communication, including a periodicity of the QoS flow and burst arrival time (or time at which a burst arrives at an ingress of a base station) |

In Table 2, ">" represents an information element of a first level in the QoS flow parameter list, and ">>" represents an information element whose level is lower than a level of the ">" information element. An information element ">QoS flow parameter item" includes two information elements of a same level: the QoS flow identifier and the TSCAI/downlink TSCAI. The TSCAI/downlink TSCAI indicates burst arrival time.

The following describes an expression form of the information element "TSCAI" by using Table 3.

TABLE 3

| IE/Group name | Semantic description |
| --- | --- |
| Periodicity | Periodicity |
| Burst arrival time | Time at which a data burst arrives at an egress of a terminal in an uplink direction or time at which a data burst arrives at an ingress of a base station in a downlink direction |

An optional carrying manner 3 is shown in Table 4.

TABLE 4

| IE/Group name | Semantic description Semantics description |
| --- | --- |
| >QoS flow parameter item | Refer to TS 38.413 |
| >>QoS flow identifier | Refer to TS 38.413 |
| >>TSC traffic characteristic | Indicate assistance information of uplink and downlink QoS flows in time sensitive communication |

In Table 4, ">" represents an information element of a first level in the QoS flow parameter list, and ">>" represents an information element whose level is lower than a level of the ">" information element. An information element ">QoS flow parameter item" includes two information elements of a same level: the QoS flow identifier and the time sensitive communication (TSC) traffic characteristic. The TSC traffic characteristic indicates the assistance information of the downlink QoS flow, and the assistance information of the downlink QoS flow may include burst arrival time.

The following describes an expression form of the information element "TSC traffic characteristic" by using Table 5.

TABLE 5

| IE/Group name | Semantic description |
| --- | --- |
| Downlink TSC assistance Information | Periodicity during which a downlink QoS flow arrives at a base station and time at which a burst arrives at an ingress of the base station. |
| Uplink TSC assistance information | Periodicity during which an uplink QoS flow arrives at a terminal and time at which a burst arrives at an egress of the terminal |

It can be understood that Table 1 to Table 5 are only some examples of a manner of carrying burst arrival time. In actual application, the manner of carrying the burst arrival time may further have another information element expression form.

In this embodiment of this application, the burst arrival time may be a specific moment, or may be a time range. Because Jitter may exist in the burst arrival time, time at which a data burst arrives at a network device in a periodicity may be a time range. Alternatively, a data burst includes a plurality of data packets. A time range is also formed from time at which the first data packet arrives at the network device to time at which the last data packet arrives at the network device. When the burst arrival time is a time range, a time range of a data burst may also be referred to as a data burst spread.

The first network device may obtain the data burst spread based on the foregoing manner of obtaining the first burst arrival time. For a manner of carrying the data burst spread, refer to the foregoing manner of carrying the burst arrival time.

The following uses the first burst arrival time as an example to describe a data burst spread scenario. Certainly, this is also applicable to the second burst arrival time. The first burst arrival time is burst arrival time at which the downlink QoS flow arrives at the ingress of the first network device.

Figure 7:
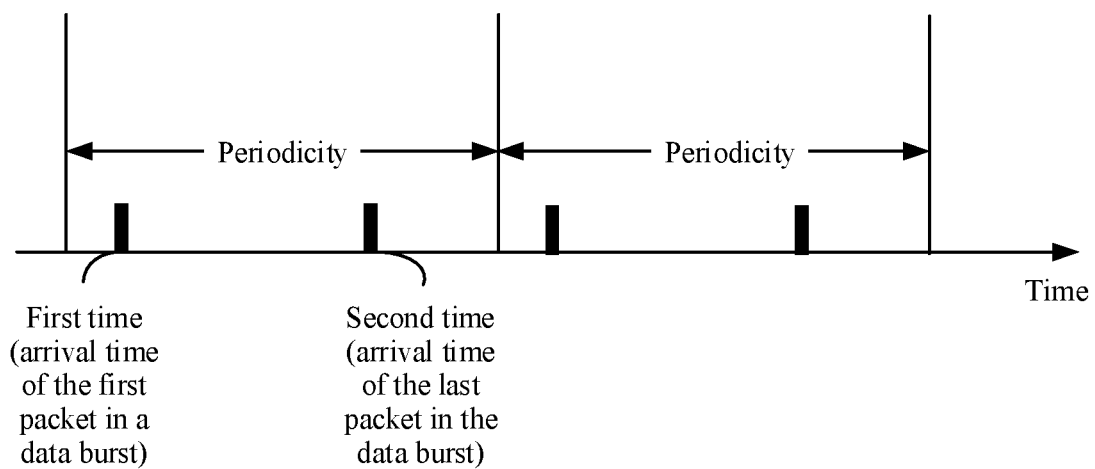
FIG. 7 is a first schematic diagram of a data burst spread scenario according to an embodiment of this application.

In a data burst spread scenario, as shown in FIG. 7, the first burst arrival time may include first time and second time. The first time is time at which the first data packet of the downlink QoS flow arrives at the ingress of the first network device within the first periodicity, and the second time is time at which the last data packet of the downlink QoS flow arrives at the ingress of the first network device within the first periodicity. It can be understood that when jitter exists, the last data packet herein is actually the first data packet. Due to jitter of the first data packet, the data packet may arrive at the first network device within both a range of the first time and a range of the second time.

Figure 8:
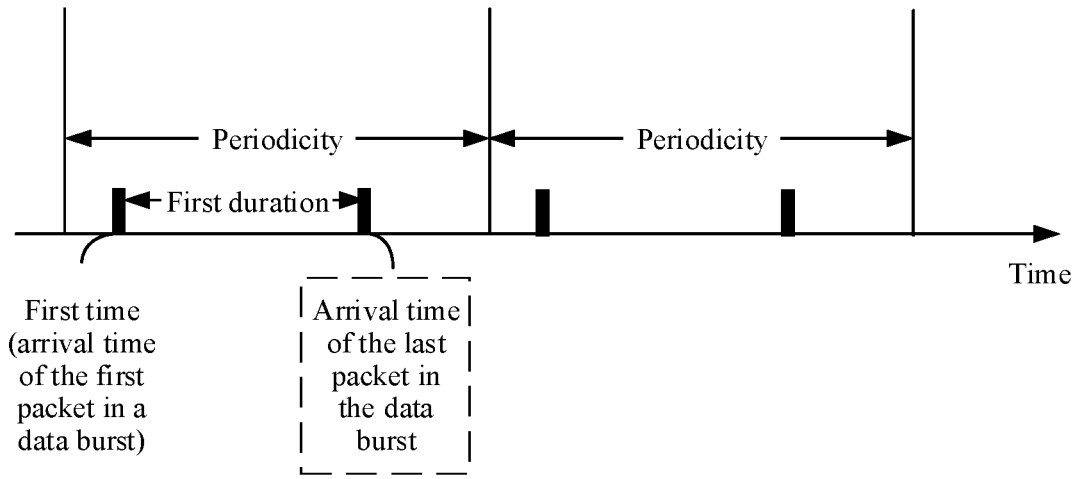
FIG. 8 is a second schematic diagram of a data burst spread scenario according to an embodiment of this application.

In a data burst spread scenario, as shown in FIG. 8, the first burst arrival time may include first time and first duration. The first time is time at which the first data packet of the downlink QoS flow arrives at the ingress of the first network device within the first periodicity. A moment that is after the first time and that is at a distance of the first duration from the first time is second time, and the second time is time at which the last data packet of the downlink QoS flow arrives at the ingress of the first network device within the first periodicity. The first duration may be understood as a burst spread length. It can be understood that when jitter exists, the last data packet herein is actually the first data packet. Due to jitter of the first data packet, the data packet may arrive at the first network device within both a range of the first time and a range of the second time.

Figure 9:
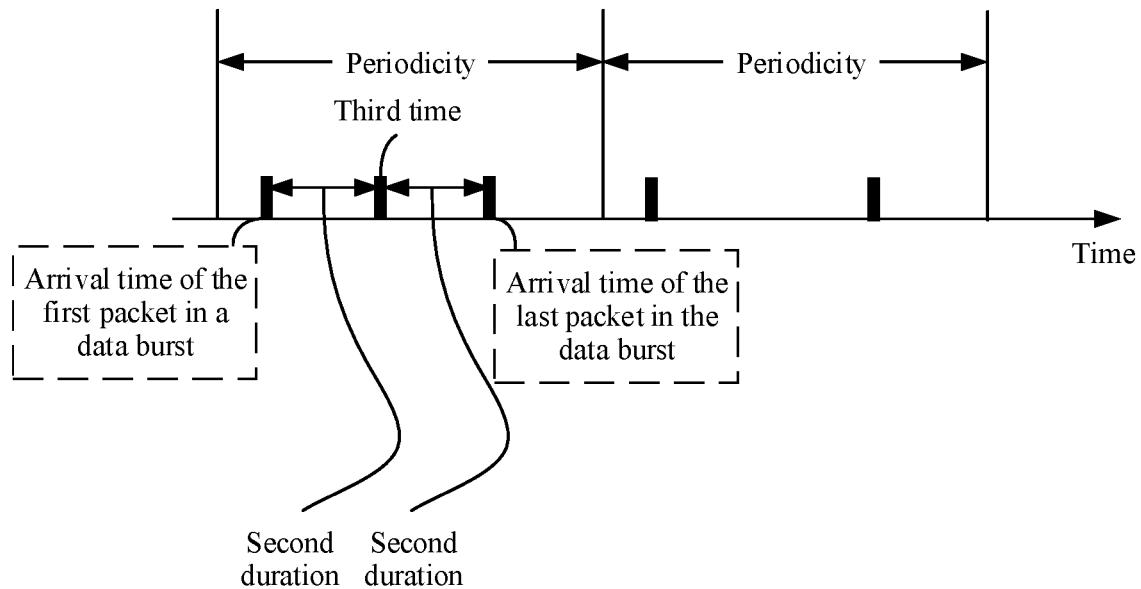
FIG. 9 is a third schematic diagram of a data burst spread scenario according to an embodiment of this application.

In a data burst spread scenario, as shown in FIG. 9, the first burst arrival time includes third time and second duration. A moment that is before the third time and that is at a distance of the second duration from the third time is fourth time. A moment that is after the third time and that is at a distance of the second duration from the third time is fifth time. The fourth time is time at which the first data packet of the downlink QoS flow arrives at the ingress of the first network device within the first periodicity, and the fifth time is time at which the last data packet of the downlink QoS flow arrives at the ingress of the first network device within the first periodicity. The second duration may be understood as half the burst spread length. The third time is a moment between the fourth time and the fifth time. It can be understood that when jitter exists, the last data packet herein is actually the first data packet. Due to jitter of the first data packet, the data packet may arrive at the first network device within both a range of the first time and a range of the second time.

Certainly, FIG. 7 to FIG. 9 are only possible expression forms of the first burst arrival time in the data burst spread scenario. In actual application, the first burst arrival time may be indicated in another form.

If the burst arrival time is indicated based on the form in FIG. 8, it is assumed that when the second burst arrival time includes the second duration, the first network device may obtain the second duration from the second network device. Therefore, the AMF may indicate the first time to the first network device, and does not need to further indicate the second duration. The first network device may determine, based on the second duration obtained from the second network device, the data burst spread corresponding to the first burst arrival time.

If the burst arrival time is indicated based on the form in FIG. 9, it is assumed that when the second burst arrival time includes third duration, the first network device may obtain the third duration from the second network device. Therefore, the AMF may indicate the third time to the first network device, and does not need to further indicate the third duration. The first network device may determine, based on the third duration obtained from the second network device, the data burst spread corresponding to the first burst arrival time.

It should be noted that the method provided in this embodiment of this application may also be applied to a CU-DU separation architecture and/or a CP/UP separation architecture. In the CU/DU separation architecture, for an operation performed by the CU, refer to the foregoing operation performed by a network device. For example, the CU sends a path switch request message to the AMF, and the CU receives a path switch request response message from the AMF. The CU determines, based on the path switch request response message, first burst arrival time at which a downlink QoS flow arrives at an ingress of a network device within a first periodicity. The CU may send the first burst arrival time to the DU through an F1 interface, so that the DU performs data transmission based on the first burst arrival time. For a detailed process of the F1 interface, refer to the specification 3GPP TS 38.473 v15.7.0. Details are not described herein.

Similarly, in the CP/UP separation architecture, for an operation performed by a CU-CP, refer to the foregoing operation performed by a network device. For example, the CU-CP sends a path switch request message to the AMF, and the CU-CP receives a path switch request response message from the AMF. The CU-CP determines, based on the path switch request response message, first burst arrival time at which a downlink QoS flow arrives at an ingress of a network device within a first periodicity. The CU-CP sends the first burst arrival time to a CU-UP through an E1 interface, so that the CU-UP performs data transmission based on the first burst arrival time. Corresponding information exchange needs to be added to the E1 interface, to help the CU-UP perform data transmission based on the first burst arrival time.

In the foregoing embodiments provided in this application, the method provided in the embodiments of this application is separately described from perspectives of the first network device, the AMF, and interaction between the first network device and the AMF.

To implement functions in the method provided in the foregoing embodiments of this application, the first network device and the AMF may include hardware structures and/or software modules, to implement the functions in a form of a hardware structure, a software module, or a hardware structure plus a software module. Whether one of the foregoing functions is performed in the manner of a hardware structure, a software module, or a hardware structure plus a software module depends on specific applications and design constraints of the technical solutions.

Figure 10:
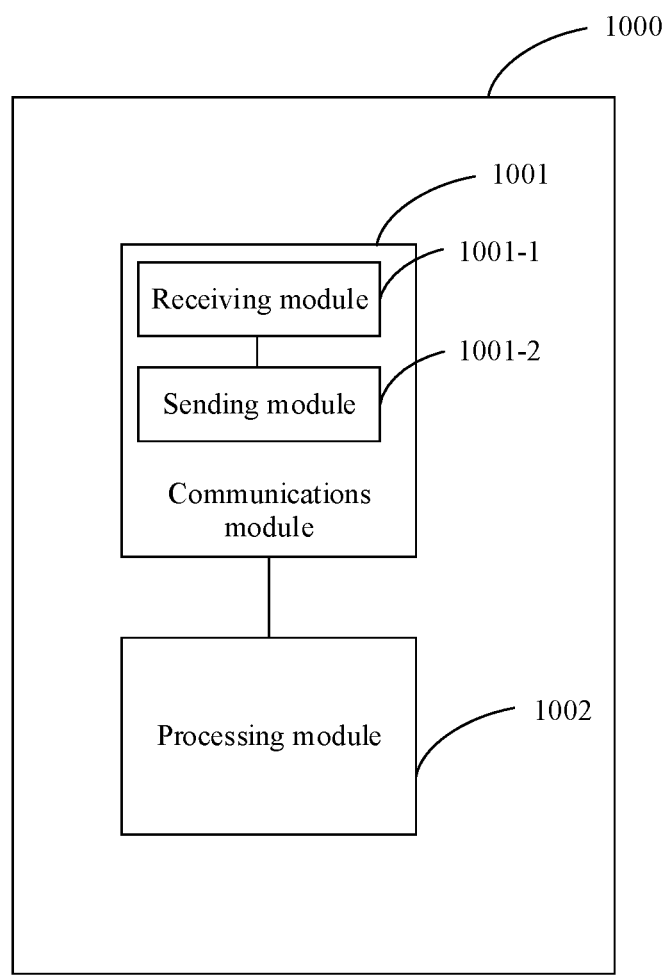
FIG. 10 is a first schematic diagram of a structure of a communications apparatus according to an embodiment of this application.

As shown in FIG. 10, based on a same technical idea, an embodiment of this application further provides a communications apparatus 1000. The communications apparatus 1000 may be a first network device or an AMF, may be an apparatus in the first network device or the AMF, or may be an apparatus that can match the first network device or the AMF for use. In a design, the communications apparatus 1000 may include modules that are in a one-to-one correspondence with methods/operations/steps/actions performed by the first network device or the AMF in the foregoing method embodiment. The module may be implemented by using a hardware circuit, software, or a hardware circuit in combination with software. In a design, the communications apparatus 1000 may include a communications module 1001 and a processing module 1002. Further, the communications module 1001 may include a receiving module 1001-1 and a sending module 1001-2. The processing module 1002 is configured to invoke the communications module 1001 to receive and/or send a signal.

When the communications apparatus 1000 is configured to perform an operation of the first network device, the communications module 1001 is configured to: send a path switch request message to an access and mobility management function, where the path switch request message is used to request for switching least one radio bearer RB of a terminal device from a second network device to the first network device; and receive a path switch request response message from the access and mobility management function.

The processing module 1002 is configured to determine, based on the path switch request response message, first burst arrival time at which a downlink quality of service QoS flow arrives at an ingress of the first network device within a first periodicity, where the first burst arrival time is used for downlink scheduling.

The communications module 1001 and the processing module 1002 are further configured to perform other operations performed by the first network device in the foregoing method embodiment. Details are not described herein again.

When the communications apparatus 1000 is configured to perform an operation of the AMF, the receiving module 1001-1 is configured to receive a path switch request message from a first network device, where the path switch request message is used to request for switching least one radio bearer RB of a terminal device from a second network device to the first network device; and the sending module 1001-2 is configured to send a path switch request response message to the first network device, where the path switch request response message is used by the first network device to determine first burst arrival time at which a downlink quality of service QoS flow arrives at an ingress of the first network device within a first periodicity, and the first burst arrival time is used for downlink scheduling.

The receiving module 1001-1, the sending module 1001-2, and the processing module 1002 are further configured to perform other operations performed by the AMF in the foregoing method embodiment. Details are not described herein again.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 11:
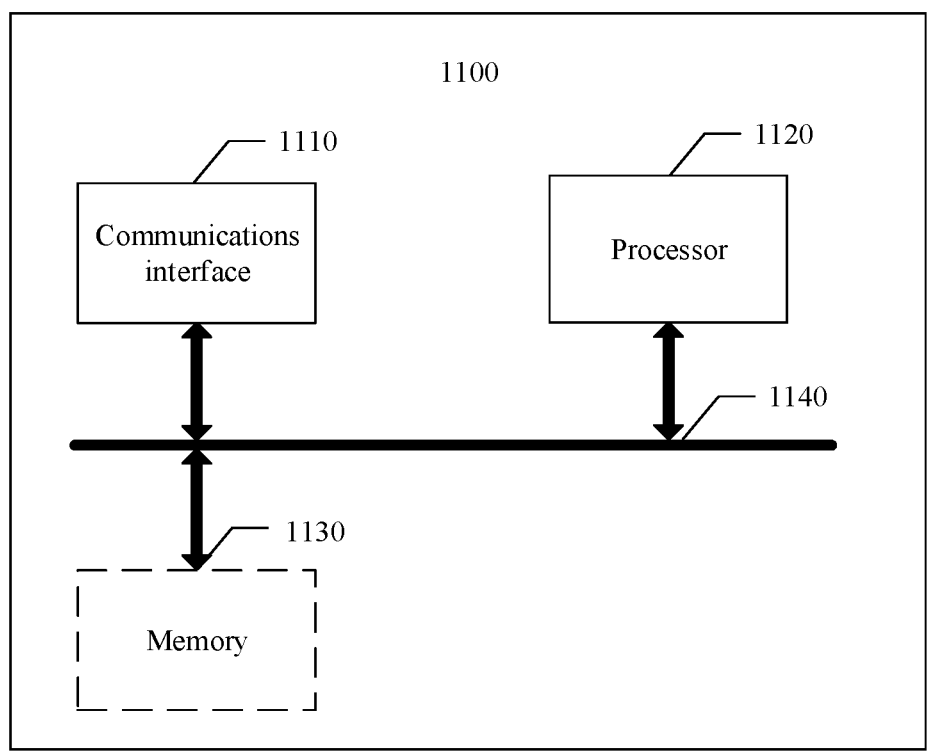
FIG. 11 is a second schematic diagram of a structure of a communications apparatus according to an embodiment of this application.

FIG. 11 shows a communications apparatus 1100 according to an embodiment of this application, where the communications apparatus 1100 is configured to implement a function of the AMF or the first network device in the foregoing method. When the function of the first network device is implemented, the apparatus may be the first network device, may be an apparatus in the first network device, or may be an apparatus that can match the first network device for use. When the function of the AMF is implemented, the apparatus may be the AMF, may be an apparatus in the AMF, or may be an apparatus that can match the AMF for use. The apparatus may be a chip system. In this embodiment of this application, the chip system may include a chip, or include the chip and another discrete device. The communications apparatus 1100 includes at least one processor 1120, configured to implement a function of the AMF or the first network device in the method provided in the embodiments of this application. The apparatus 1100 may further include a communications interface 1110. In this embodiment of this application, the communications interface may be a transceiver, a circuit, a bus, a module, or another type of communications interface, and is configured to communicate with another device by using a transmission medium. For example, the communications interface 1110 is used by an apparatus in the communications apparatus 1100 to communicate with another device. For example, when the communications apparatus 1100 is the first network device, the another device may be the AMF. When the communications apparatus 1100 is the AMF, the another device may be the first network device. The processor 1120 receives and sends data through the communications interface 1110, and is configured to implement the method in the foregoing method embodiment.

For example, when the function of the AMF is implemented, the processor 1120 is configured to invoke the communications apparatus 1100 to perform the following operations: receiving a path switch request message from a first network device, where the path switch request message is used to request for switching least one radio bearer RB of a terminal device from a second network device to the first network device; and sending a path switch request response message to the first network device, where the path switch request response message is used by the first network device to determine first burst arrival time at which a downlink quality of service QoS flow arrives at an ingress of the first network device within a first periodicity, and the first burst arrival time is used for downlink scheduling.

When the function of the first network device is implemented, the communications interface 1110 is configured to: send a path switch request message to an access and mobility management function, where the path switch request message is used to request for switching least one radio bearer RB of a terminal device from a second network device to the first network device; and receive a path switch request response message from the access and mobility management function. The processor 1120 is configured to determine, based on the path switch request response message, first burst arrival time at which a downlink quality of service QoS flow arrives at an ingress of the first network device within a first periodicity, where the first burst arrival time is used for downlink scheduling.

The processor 1120 and the communications interface 1110 may be further configured to perform other corresponding steps or operations performed by the AMF or the first network device in the foregoing method embodiment. Details are not described herein again.

The communications apparatus 1100 may further include at least one memory 1130, configured to store program instructions and/or data. The memory 1130 is coupled to the processor 1120. The coupling in this embodiment of this application is indirect coupling or a communications connection between apparatuses, units, or modules for information exchange between the apparatuses, the units, or the modules, and may be in electrical, mechanical, or other forms. The processor 1120 may operate in cooperation with the memory 1130. The processor 1120 may execute the program instructions stored in the memory 1130. At least one of the at least one memory may be integrated with the processor.

A specific connection medium among the communications interface 1110, the processor 1120, and the memory 1130 is not limited in this embodiment of this application. In FIG. 11 in this embodiment of this application, the memory 1130, the processor 1120, and the communications interface 1110 are connected by using a bus 1140. The bus is represented by a bold line in FIG. 11. A connection manner between other components is merely an example description, and is not limited thereto. The bus may be classified into an address bus, a data bus, a control bus, and the like. For ease of representation, only one bold line is used to represent the bus in FIG. 11, but this does not mean that there is only one bus or only one type of bus.

When the communications apparatus 1000 and the communications apparatus 1100 are specifically chips or chip systems, the communications module 1102 and the communications interface 1110 may output or receive a baseband signal. When the communications apparatus 1000 and the communications apparatus 1100 are specifically devices, the communications module 1102 and the communications interface 1110 may output or receive a radio frequency signal. In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the methods disclosed with reference to embodiments of this application may be directly performed by a hardware processor, or may be performed by a combination of hardware and software modules in the processor.

In this embodiment of this application, the memory 1130 may be a nonvolatile memory, such as a hard disk drive (HDD) or a solid-state drive (SSD), or may be a volatile memory, such as a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

Some or all of the operations and functions performed by the first network device or the AMF described in the foregoing method embodiment of this application may be completed by using a chip or an integrated circuit.

To implement the foregoing functions of the communications apparatus in FIG. 10 or FIG. 11, an embodiment of this application further provides a chip, including a processor, configured to support the communications apparatus in implementing functions related to the first network device or the AMF in the foregoing method embodiment. In a possible design, the chip is connected to a memory or the chip includes a memory, and the memory is configured to store program instructions and data that are necessary for the communications apparatus.

An embodiment of this application provides a computer-readable storage medium that stores a computer program, and the computer program includes instructions used to perform the foregoing method embodiment.

An embodiment of this application provides a computer program product that includes instructions. When the computer program product is run on a computer, the foregoing method embodiment is performed.

Persons skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn of the basic inventive concept. Therefore, the following claims are intended to be construed as covering the preferred embodiments and all changes and modifications falling within the scope of this application.

Clearly, persons skilled in the art can make various modifications and variations to embodiments of this application without departing from the spirit and scope of embodiments of this application. In this case, this application is intended to cover these modifications and variations provided that they fall within the scope of protection defined by the following claims and their equivalent technologies.

What is claimed is:

1. A method for configuring assistance information, comprising:
sending, by a first network device, a path switch request message to an access and mobility management function (AMF), wherein the path switch request message is used to request for switching at least one radio bearer (RB) of a terminal device from a second network device to the first network device;
receiving, by the first network device, a path switch request response message from the AMF; and
determining, by the first network device and based on the path switch request response message, a first burst arrival time at which a downlink quality of service (QOS) flow arrives at an ingress of the first network device within a first periodicity, wherein the first burst arrival time is used for downlink scheduling.

2. The method according to claim 1, wherein the path switch request response message carries the first burst arrival time.

3. The method according to claim 1, further comprising:
receiving a handover request message from the second network device, wherein the handover request message is used to request for switching at least one RB of the terminal device from the second network device to the first network device and the handover request message carries a second burst arrival time and a first packet delay budget (PDB) between a user plane function and the second network device, wherein the second burst arrival time is time at which a burst of the downlink QoS flow arrives at an ingress of the second network device within a second periodicity, and wherein the path switch request response message carries a second PDB between the user plane function and the first network device; and
the determining, based on the path switch request response message, the first burst arrival time at which a downlink QoS flow arrives at an ingress of the first network device within a first periodicity comprises determining the first burst arrival time based on the second burst arrival time, the first PDB, and the second PDB.

4. The method according to claim 3, wherein the first burst arrival time meets the following relationship formula:

first burst arrival time=second burst arrival time−first PDB+second PDB.

5. The method according to claim 1, wherein the first burst arrival time is carried in time sensitive communication assistance information.

6. The method according to claim 1, wherein:
wherein the first burst arrival time comprises a first time and a second time, the first time is a time at which a first data packet of the downlink QoS flow arrives at the ingress of the first network device within the first periodicity, and the second time is a time at which a last data packet of the downlink QoS flow arrives at the ingress of the first network device within the first periodicity: or
wherein the first burst arrival time comprises the first time and a first duration, the first time is the time at which the first data packet of the downlink QoS flow arrives at the ingress of the first network device within the first periodicity, a moment that is after the first time and that a distance of the first duration from the first time is the second time, and the second time is the time at which the last data packet of the downlink QoS flow arrives at the ingress of the first network device within the first periodicity: or
wherein the first burst arrival time comprises a third time and a second duration, a moment that is before the third time and a distance of the second duration from the third time is a fourth time, a moment that is after the third time and a distance of the second duration from the third time is a fifth time, wherein the fourth time is the time at which the first data packet of the downlink QoS flow arrives at the ingress of the first network device within the first periodicity, and wherein the fifth time is a time at which the last data packet of the downlink QOS flow arrives at the ingress of the first network device within the first periodicity.

7. An apparatus, comprising a processor and a memory comprising instructions, wherein the processor is coupled to the memory, and the processor is configured to execute the instructions to:
send a path switch request message to an access and mobility management function (AMF), wherein the path switch request message is used to request for switching at least one radio bearer (RB) of a terminal device from a second network device to a first network device;
receive a path switch request response message from the AMF; and
determine, based on the path switch request response message, a first burst arrival time at which a downlink quality of service (QOS) flow arrives at an ingress of the first network device within a first periodicity, wherein the first burst arrival time is used for downlink scheduling.

8. The apparatus according to claim 7, wherein the path switch request response message carries the first burst arrival time.

9. The apparatus according to claim 7, wherein the processor is further configured to execute the instructions to:
receive a handover request message from the second network device, wherein the handover request message is used to request for switching at least one RB of the terminal device from the second network device to the first network device and the handover request message carries a second burst arrival time and a first packet delay budget (PDB) between a user plane function and the second network device, wherein the second burst arrival time is time at which a burst of the downlink QoS flow arrives at an ingress of the second network device within a second periodicity, and wherein the path switch request response message carries a second PDB between the user plane function and the first network device; and
determine, based on the path switch request response message, the first burst arrival time at which a downlink QoS flow arrives at an ingress of the first network device within a first periodicity comprises determining the first burst arrival time based on the second burst arrival time, the first PDB, and the second PDB.

10. The apparatus according to claim 7, wherein the first burst arrival time is carried in time sensitive communication assistance information.

11. The apparatus according to claim 7, wherein:
wherein the first burst arrival time comprises a first time and a second time, the first time is a time at which a first data packet of the downlink QoS flow arrives at the ingress of the first network device within the first periodicity, and the second time is a time at which a last data packet of the downlink QoS flow arrives at the ingress of the first network device within the first periodicity: or
wherein the first burst arrival time comprises the first time and a first duration, the first time is the time at which the first data packet of the downlink QoS flow arrives at the ingress of the first network device within the first periodicity, a moment that is after the first time and that a distance of the first duration from the first time is the second time, and the second time is the time at which the last data packet of the downlink QoS flow arrives at the ingress of the first network device within the first periodicity: or
wherein the first burst arrival time comprises a third time and a second duration, a moment that is before the third time and a distance of the second duration from the third time is a fourth time, a moment that is after the third time and a distance of the second duration from the third time is a fifth time, wherein the fourth time is the time at which the first data packet of the downlink QoS flow arrives at the ingress of the first network device within the first periodicity, and wherein the fifth time is the time at which the last data packet of the downlink QoS flow arrives at the ingress of the first network device within the first periodicity.

12. An apparatus, comprising a processor and a memory comprising instructions, wherein the processor is coupled to the memory, and the processor is configured to execute the instructions to:
receive a path switch request message from a first network device, wherein the path switch request message is used to request for switching at least one radio bearer (RB) of a terminal device from a second network device to the first network device; and
send a path switch request response message to the first network device, wherein the path switch request response message is used by the first network device to determine a first burst arrival time at which a downlink quality of service (QOS) flow arrives at an ingress of the first network device within a first periodicity, and wherein the first burst arrival time is used for downlink scheduling.

13. The apparatus according to claim 12, wherein the path switch request response message carries the first burst arrival time.

14. The apparatus according to claim 12, wherein the first burst arrival time is carried in time sensitive communication assistance information.

15. The apparatus according to claim 12, wherein:
wherein the first burst arrival time comprises a first time and a second time, the first time is a time at which a first data packet of the downlink QoS flow arrives at the ingress of the first network device within the first periodicity, and the second time is a time at which a last data packet of the downlink QoS flow arrives at the ingress of the first network device within the first periodicity: or
wherein the first burst arrival time comprises the first time and a first duration, the first time is the time at which the first data packet of the downlink QoS flow arrives at the ingress of the first network device within the first periodicity, a moment that is after the first time and that a distance of the first duration from the first time is the second time, and the second time is the time at which the last data packet of the downlink QoS flow arrives at the ingress of the first network device within the first periodicity: or
wherein the first burst arrival time comprises a third time and a second duration, a moment that is before the third time and a distance of the second duration from the third time is a fourth time, a moment that is after the third time and a distance of the second duration from the third time is a fifth time, wherein the fourth time is the time at which the first data packet of the downlink QoS flow arrives at the ingress of the first network device within the first periodicity, and wherein the fifth time is the time at which the last data packet of the downlink QoS flow arrives at the ingress of the first network device within the first periodicity.

16. A communications system, comprising:
a first network device; and
an access and mobility management function (AMF),
wherein the first network device is configured to:
send a path switch request message to the AMF, wherein the path switch request message is used to request for switching at least one radio bearer (RB) of a terminal device from a second network device to the first network device;
receive a path switch request response message from the AMF; and
determine, based on the path switch request response message, a first burst arrival time at which a downlink quality of service (QOS) flow arrives at an ingress of the first network device within a first periodicity, wherein the first burst arrival time is used for downlink scheduling, and
wherein the AMF is configured to:
receive the path switch request message from a first network device; and
send the path switch request response message to the first network device.

17. The system according to claim 16, wherein the path switch request response message carries the first burst arrival time.

18. The system according to claim 16, wherein the first network device is further configured to:
receive a handover request message from the second network device, wherein the handover request message is used to request for switching at least one RB of the terminal device from the second network device to the first network device and the handover request message carries second burst arrival time and a first packet delay budget (PDB) between a user plane function and the second network device, wherein the second burst arrival time is time at which a burst of the downlink QoS flow arrives at an ingress of the second network device within a second periodicity, and wherein the path switch request response message carries a second PDB between the user plane function and the first network device; and
determine the first burst arrival time based on the second burst arrival time, the first PDB, and the second PDB.

19. The system according to claim 16, wherein the first burst arrival time is carried in time sensitive communication assistance information.

20. The system according to claim 16, wherein:
wherein the first burst arrival time comprises a first time and a second time, the first time is a time at which a first data packet of the downlink QoS flow arrives at the ingress of the first network device within the first periodicity, and the second time is a time at which a last data packet of the downlink QoS flow arrives at the ingress of the first network device within the first periodicity: or
wherein the first burst arrival time comprises the first time and a first duration, the first time is the time at which the first data packet of the downlink QoS flow arrives at the ingress of the first network device within the first periodicity, a moment that is after the first time and that a distance of the first duration from the first time is the second time, and the second time is the time at which the last data packet of the downlink QoS flow arrives at the ingress of the first network device within the first periodicity: or
wherein the first burst arrival time comprises a third time and a second duration, a moment that is before the third time and a distance of the second duration from the third time is a fourth time, a moment that is after the third time and a distance of the second duration from the third time is a fifth time, wherein the fourth time is the time at which the first data packet of the downlink QoS flow arrives at the ingress of the first network device within the first periodicity, and wherein the fifth time is the time at which the last data packet of the downlink QoS flow arrives at the ingress of the first network device within the first periodicity.

* * * * *